United States Patent [19]
Grob et al.

[11] Patent Number: 5,737,708
[45] Date of Patent: Apr. 7, 1998

[54] METHOD FOR HANDLING UNRECOGNIZABLE COMMANDS IN A WIRELESS ENVIRONMENT

[75] Inventors: Matthew S. Grob, San Diego; Gadi Karmi, Del Mar, both of Calif.

[73] Assignee: Qualcomm Incorporated, San Diego, Calif.

[21] Appl. No.: 337,904

[22] Filed: Nov. 14, 1994

Related U.S. Application Data

[63] Continuation-in-part of Ser. No. 152,159, Nov. 15, 1993, abandoned.

[51] Int. Cl.$^6$ ........................................................ H04Q 7/22
[52] U.S. Cl. ........................ 455/557; 379/93.01; 455/422
[58] Field of Search ............................. 379/58, 59, 60, 379/63, 93, 96, 97, 98, 399, 93.01, 93.06, 93.28; 455/33.1, 54.1, 66, 420, 422, 550, 557, 559; 375/222, 219, 220; 370/85.13, 74.1

[56] References Cited

U.S. PATENT DOCUMENTS

| 4,837,800 | 6/1989 | Freeburg et al. | 379/59 |
|---|---|---|---|
| 4,989,243 | 1/1991 | Choi | 375/222 |
| 5,127,041 | 6/1992 | O'Sullivan | 379/98 |
| 5,159,625 | 10/1992 | Zicker | 379/60 |
| 5,297,192 | 3/1994 | Gerszberg | 379/59 |
| 5,408,520 | 4/1995 | Clark et al. | 379/58 X |
| 5,420,916 | 5/1995 | Sekiguchi | 370/85.13 X |
| 5,428,671 | 6/1995 | Dykes et al. | 379/93 |

FOREIGN PATENT DOCUMENTS

| 0368055 | 5/1990 | European Pat. Off. | H04L 29/06 |
|---|---|---|---|
| WO 91/07044 | 5/1991 | WIPO | H04M 11/00 |

OTHER PUBLICATIONS

*Interoperable Wireless Data*, David Weissman, et al., IEEE Communications Magazine 31, No. 2, New York, Feb. 1993.

*Primary Examiner*—Dwayne D. Bost
*Assistant Examiner*—William G. Trost
*Attorney, Agent, or Firm*—Russell B. Miller; Brian S. Edmonston

[57] ABSTRACT

The process of the present invention enables a wireless modem to accept from a computer commands that it does not recognize. The computer (210) sends a command to the wireless modem (260) to forward all commands to modems (270) at a base station (280). The base station modems (270) then interpret the commands and act accordingly. When the computer (210) no longer wishes the wireless modem (260) to ignore commands it does not recognize, the computer (210) sends another command to the modem (260) instructing it to either flag unknown commands as errors or to ignore them.

16 Claims, 2 Drawing Sheets

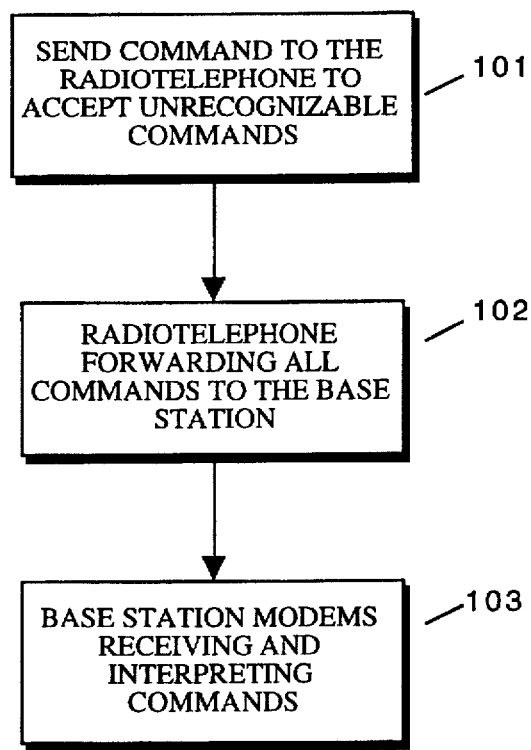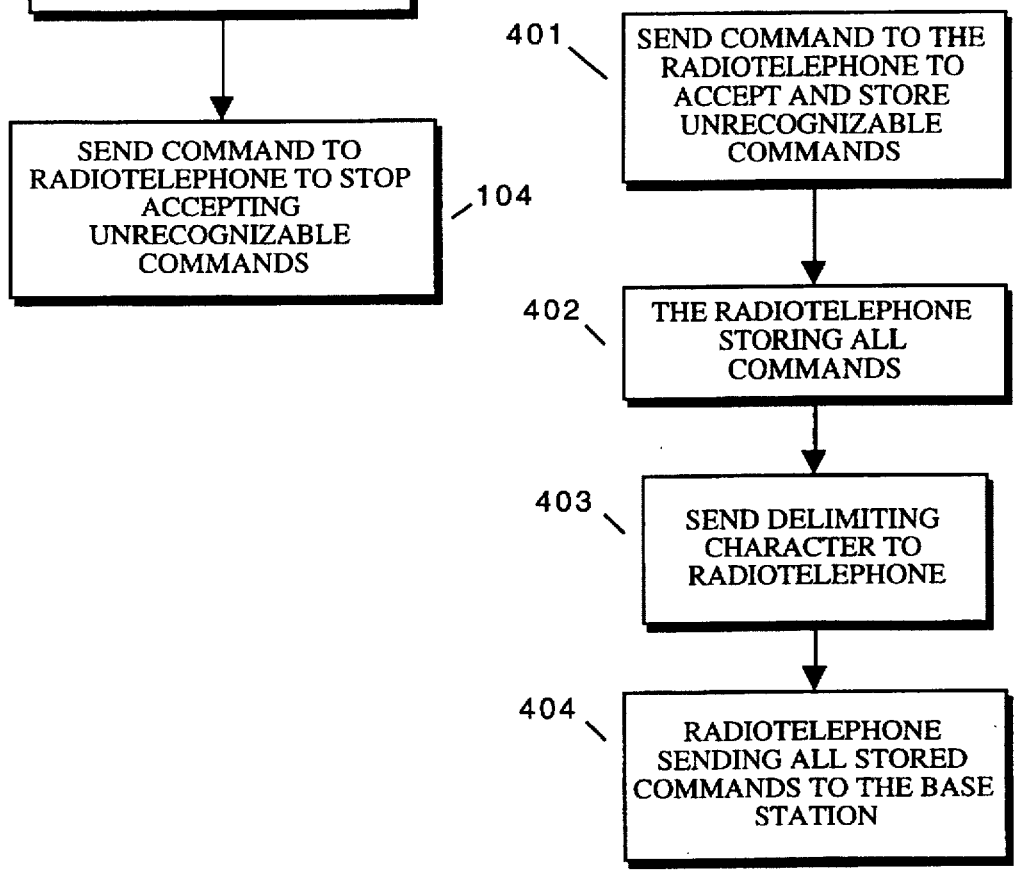

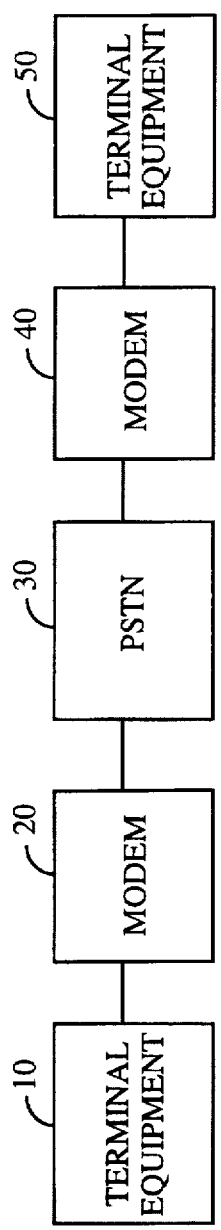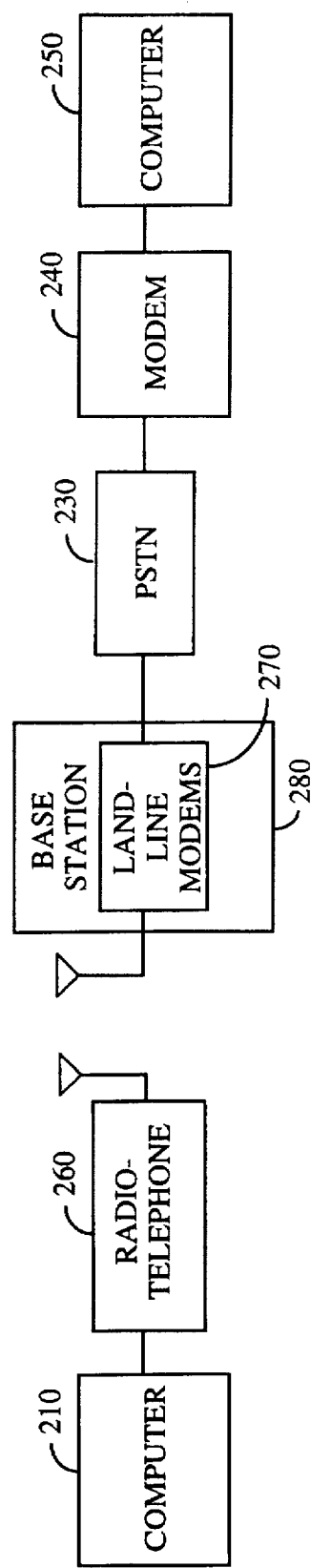
- PRIOR ART -
FIG. 3
FIG. 2

METHOD FOR HANDLING UNRECOGNIZABLE COMMANDS IN A WIRELESS ENVIRONMENT

This is a Continuation-In-Part of application Ser. No. 08/152,159, filed Nov. 15, 1993, now abandoned.

BACKGROUND OF THE INVENTION

I. Field of the Invention

The present invention relates generally to the field of communications. More particularly, the present invention relates to the field of data communications in a radiotelephone environment.

II. Description of the Related Art

Modems operating over public switched telephone networks (PSTN) can be configured using various standard and non-standard commands that are well known in the art. Examples of such commands can be found in Electronic Industries Association/Telephone Industries Association (EIA/TIA) 602. These modems are typically wired to a computer or other type of terminal by a data bus. The terminal can provide commands and data to the modem over this bus. An example of such a system is illustrated in FIG. 3.

In this system, if one terminal equipment (10) needs to send data to the other terminal equipment (50), the transmitting terminal equipment (10) sends the data to a modem (20) that converts the data into an audible signal for transmission over the telephone lines (30). The receiving modem (40) converts this audible signal back into digital data that can be interpreted by the other terminal (50). These terminals (10 and 50) include computers and facsimile devices.

Certain modems can also be used to transmit data in a wireless communication environment, such as a cellular radiotelephone system. Laptop computers can be connected to wireless modems, thus enabling the computer to transmit and receive data in a wireless environment. To provide data services to radiotelephone users, some radiotelephone service carriers have modems at the base station to demodulate and decode the received data transmission from the computer/wireless modem combination. The base station typically forwards the demodulated data signal to a switching center. The switching center then routes the signal to a group of modems operating over the PSTN. The signal is encoded and modulated by these modems before it is routed by the PSTN to its final destination.

Configuration and control commands that are typically sent to the modem over the bus in a wired configuration must be transmitted by the wireless modem to the land-line modem. In some instances, the terminal may need to send a command recognizable by the land-line modem that is not recognized by the wireless modem. In this case, the wireless modem may reject such commands, making it difficult for the wireless system operator to introduce enhancements to the land-line modems since the wireless modem users may not be compatible.

If the wireless modem accepted and transmitted all unrecognized commands to the land modem, the terminal user would incur charges from the wireless system operator even if the land-line modem couldn't interpret the commands either. There is a resulting need for an improved method for handling unrecognized modem commands.

SUMMARY OF THE INVENTION

The process of the present invention enables a wireless modem to handle commands that it does not recognize. The wireless modem is coupled to and accepts commands from processing means. The modem and processing means communicates data to a base station in a wireless communication system. The process begins by the processing means sending a command to the wireless modem to accept all further commands from the processing means, whether the modem recognizes them or not. The modem then forwards all further commands from the processing means to the base station.

In an alternate embodiment, the processing means sends a command to the modem instructing it to stop accepting unrecognizable commands. After receiving such a command, the modem either ignores unrecognizable commands or sends an error message to the processing means.

BRIEF DESCRIPTION OF THE DRAWINGS

FIG. 1 shows a flowchart of the process of the present invention.

FIG. 2 shows a block diagram of the radiotelephone system of the present invention.

FIG. 3 shows a prior art communications system for data communications.

FIG. 4 shows a flow chart of an alternate embodiment of the process of the present invention.

DETAILED DESCRIPTION OF THE PREFERRED EMBODIMENT

In the preferred embodiment, the process of the present invention operates in the radiotelephone system illustrated in FIG. 2. This system is comprised of a computer (210) that has a facsimile adapter and appropriate facsimile software. The computer (210) is coupled to a radiotelephone (260) that has a digital cellular mode. The radiotelephone (260) acts as a wireless modem since it takes data from the computer (210), encodes and modulates the data, and transmits it over the channel. In the preferred embodiment, the radiotelephone (260) encodes and modulates the data in the format required by the specification EIA/TIA IS-95 for code division multiple access (CDMA) communications. The following discussion will refer to the preferred embodiment of using a radiotelephone having a digital transmission mode as the wireless modem.

A base station (280) receives the signal and demodulates and decodes it. The base station (280) is comprised of a group of modems (270) that operate over the PSTN (230). These modems (270) encode and convert the data signal into an audio signal according to various schemes known in the art, such as CCITT V.32 and V.32bis. The data signal is then switched over the PSTN (230) to a modem (240) located at the telephone number called by the remote computer/radiotelephone combination (210 and 260). The modem (240) converts this signal into a digital signal that can be interpreted by the receiving computer (250).

The process of the present invention, illustrated in FIG. 1, enables the computer to control when the radiotelephone sends commands to the group of land-line modems. When the computer is going to send a command or string of commands to the land-line modems that will not be recognized by the radiotelephone connected to the computer, the computer sends a command to the radiotelephone instructing it to accept all following commands (101), without generating an error, until instructed otherwise.

The enabling command, in the preferred embodiment, takes the form of. AT+fØ=1<cr>. The "AT" portion of the command is the attention portion of the command informing the radiotelephone that what follows is a command and is not data to be transmitted by the radiotelephone. The "fØ=1" portion of the command sets the register fØ in the radiotelephone to a 1, thus enabling all following commands to be forwarded to the land-line modems by the radiotelephone (102). The "<cr>" at the end of the command delimits the command so the radiotelephone knows the command is over and anything following this is data to be transmitted. When the base station land-line modems receive the commands, they interpret them and act accordingly (103).

When the computer needs to turn off the unrecognizable command forwarding feature of the present invention, the computer sends the command: AT+fØ=Ø<cr>, to the radiotelephone. This command sets the fØ register of the radiotelephone to a Ø, instructing the radiotelephone to stop forwarding all unrecognizable commands (104). The radiotelephone will now respond with an error message to all commands it does not recognize. The extended command set for modems is illustrated in EIA/TIA 615.

Another embodiment of the present invention, illustrated in FIG. 4, instructs the radiotelephone to store all incoming commands from the computer (401) until a delimiting character or another command instructs the radiotelephone to send the stored commands to the base station modems. An example of this is: AT+aØ=1. The "AT" portion, as in as in preferred embodiment, instructs the radiotelephone to expect a command for execution instead of data for transmission. The "aØ=1" portion sets the aØ register in the phone, thus enabling the store commands function. Everything sent after the aØ=1 will be interpreted as a command and stored by the radiotelephone (402) until the radiotelephone receives a <cr> or other delimiting character (403) from the computer. After receiving the delimiting character, the radiotelephone transmits all stored commands to the base station's land-line modems (404).

In still another embodiment of the process of the present invention, the computer instructs the radiotelephone to store all incoming commands, both known and unknown commands. These commands are stored as a character string. The character string is stored until a call is received from the base station or the radiotelephone generates a call to the base station. If either of these conditions are met, the character string is transmitted to a base station modem for interpretation.

In alternate embodiments, the command sent to the wireless modem enabling the feature of the present invention takes other forms. Other registers can be set within the modem and other commands can be used to set those registers. Additionally, just sending a command that doesn't set any registers but simply instructs the wireless modem to accept unknown commands is within the bounds of the process of the present invention.

Still other alternate embodiments replace the computer having a facsimile adapter with a dedicated facsimile machine. The facsimile machine transforms documents into the digital format for transmission by the wireless modem. Some embodiments use a subset of the computer such as a personal digital assistant also having a facsimile adapter and/or facsimile software.

In summary, the process of the present invention enables a wireless modem to handle commands that it does not recognize. This enables the operators of the base station equipment to upgrade that equipment without the problem that users will no longer be compatible once the land-line equipment is upgraded. By instructing the wireless modem to forward unknown commands and also being able to instruct the modem to stop accepting unknown commands, a user does not have to keep buying new, upgraded wireless modems to keep up with technology.

We claim:

1. A method for handling modem commands by a wireless modem in a portable communication device having a digital mode, the wireless modem coupled to a processor, the portable communication device operating in a digital cellular communication system including a base station having at least one modem, the wireless modem having a set of known modem commands wherein the at least one modem of the base station has a set of modem commands unknown to the wireless modem, the method comprising the steps of:

the processor instructing the wireless modem to accept both the known modem commands generated by the processor and the modem commands unknown to the wireless modem generated by the processor;

the wireless modem forwarding, to the base station, the known modem commands and the modem commands unknown to the wireless modem; and the processor instructing the wireless modem to stop accepting the modem commands unknown to the wireless modem.

2. The method of claim 1 further including the step of the processor setting a predefined register within the wireless modem to a first logical state, thereby causing the wireless modem to accept and store all the known modem commands generated by the processor and all the modem commands unknown to the wireless modem generated by the processor.

3. The method of claim 2 further including the step of the processor setting the predefined register within the wireless modem to a second logical state different from the first logical state, thereby preventing the wireless modem from accepting the modem commands unknown to the wireless modem generated by the processor.

4. The method of claim 1 further including the step of instructing the wireless modem to forward the known modem commands, and the modem commands unknown to the wireless modem, to the base station without interpreting the known modem commands and the modem commands unknown to the wireless modem.

5. The method of claim 4 further including the step of inhibiting the wireless modem from generating an error signal upon receiving the modem commands unknown to the wireless modem.

6. A method for handling modem commands by a radiotelephone having a digital mode, the radiotelephone operating in a digital cellular radiotelephone system, the radiotelephone being coupled to a computer and communicating with a base station having at least one modem, the radiotelephone having a set of known modem commands and the at least one modem of the base station having a set of modem commands unknown to the radiotelephone, the method comprising the steps of:

the computer instructing the radiotelephone to accept, from the computer, the known modem commands and the modem commands unknown to the radiotelephone generated by the computer;

the radiotelephone transmitting the known modem commands and the modem commands unknown to the radiotelephone to a first modem of the at least one modem of the base station; and the first modem interpreting the commands.

7. The method of claim 6 and further including the step of the computer instructing the radiotelephone to stop forwarding unknown modem commands to the first modem of the base station.

8. The method of claim 6 further including the step of instructing the radiotelephone to refrain from interpreting the known modem commands and the modem commands unknown to the radiotelephone received from the computer.

9. The method of claim 8 further including the step of inhibiting the radiotelephone from generating an error signal upon receiving the modem commands unknown to the radiotelephone.

10. In a digital cellular radiotelephone system, a method for handling modem commands by a radiotelephone having a digital mode and a set of known modem commands, the radiotelephone being coupled to a computer and communicating with a base station having at least one modem and a set of modem commands unknown to the radiotelephone, the method comprising the steps of:

the computer instructing the radiotelephone to accept and store all the known modem commands generated by the computer and all the modem commands unknown to the radiotelephone generated by the computer;

the radiotelephone saving all the known modem commands and all the modem commands unknown to the radiotelephone received from the computer; and if the radiotelephone receives a delimiting character from the computer, the radiotelephone transmitting the saved known modem commands and the modem commands unknown to the radiotelephone to a first modem of the at least one modem of the base station wherein the saved commands are transmitted without being interpreted by the radiotelephone.

11. The method of claim 10 further including the step of the computer setting a predefined register within the radiotelephone to a first logical state, thereby causing the radiotelephone to accept and store all the known modem commands generated by the computer and all the modem commands unknown to the radiotelephone generated by the computer.

12. The method of claim 11 further including the step of the computer setting the predefined register within the radiotelephone to a second logical state different from the first logical state, thereby preventing the radiotelephone from accepting the modem commands unknown to the radiotelephone generated by the computer.

13. The method of claim 10 further including the step of inhibiting generation of an error signal within the radiotelephone in response to receipt of the modem commands unknown to the radiotelephone.

14. In a digital cellular radiotelephone system, a method for handling modem commands by a radiotelephone having a digital mode and a set of known modem commands, the radiotelephone being coupled to a computer and communicating with a base station having at least one modem and a set of modem commands unknown to the radiotelephone, the method comprising the steps of:

the computer instructing the radiotelephone to accept and save all the known modem commands and all the modem commands unknown to the radiotelephone generated by the computer;

the radiotelephone saving all the known modem commands and all the modem commands unknown to the radiotelephone received from the computer into a character string;

the radiotelephone generating a call to the base station; and if a call was generated to the base station, the radiotelephone transmitting the character string to the base station without interpreting the known modem commands and the modem commands unknown to the radiotelephone within the character string.

15. The method of claim 14 further including the step of inhibiting generation of an error signal within the radiotelephone in response to receipt of the character string.

16. A method for handling industry standard modem commands provided by a processor to a portable communication device having a digital mode directly connected to the processor, the portable communication device operating in a digital cellular communication system including a base station having at least one modem, the method comprising the steps of:

instructing the portable communication device to accept a set of the industry standard modem commands generated by the processor, the set including certain ones of the industry standard modem commands not recognized by the portable communication device;

forwarding, to the base station from the portable communication device, the set of the industry standard modem commands; and instructing the portable communication device not to accept from the processor those of the industry standard modem commands not recognized by the portable communication device.

* * * * *